United States Patent [19]

Masoomain

[11] Patent Number: 5,268,104
[45] Date of Patent: Dec. 7, 1993

[54] PROCESS FOR TREATING AND REGENERATING SPENT CAUSTIC

[75] Inventor: Stephen Z. Masoomain, Houston, Tex.

[73] Assignee: Stone & Webster Engineering, Corp., Boston, Mass.

[21] Appl. No.: 910,214

[22] Filed: Jul. 9, 1992

[51] Int. Cl.$^5$ .............................................. C02F 1/32
[52] U.S. Cl. ................... 210/638; 210/639; 210/641; 210/748; 210/760; 210/916; 208/235
[58] Field of Search ............... 210/748, 760, 638, 639, 210/641, 916; 208/208 R, 226, 230, 235

[56] References Cited

U.S. PATENT DOCUMENTS

| | | | |
|---|---|---|---|
| 2,665,249 | 1/1954 | Zimmermann | 210/2 |
| 2,824,058 | 2/1958 | Zimmermann | 210/63 |
| 3,761,409 | 9/1973 | McCoy et al. | 210/63 |
| 3,963,611 | 6/1976 | Dardenne-Ankringa, Jr. | 210/63 |
| 4,000,065 | 12/1976 | Ladha et al. | 210/23 |
| 4,066,543 | 1/1978 | McCoy | 210/63 |
| 4,176,057 | 11/1979 | Wheatley et al. | 210/23 |
| 4,179,365 | 12/1979 | Sumi | 210/8 |
| 4,230,571 | 10/1980 | Dadd | 210/760 |
| 4,347,144 | 8/1982 | Bodenbenner et al. | 210/761 |
| 4,347,226 | 8/1982 | Audeh et al. | 210/761 |
| 4,350,599 | 9/1982 | Chowdury | 210/761 |
| 4,372,940 | 2/1983 | Brandenburg et al. | 423/567 |
| 4,417,986 | 11/1983 | Connaught et al. | 210/759 |
| 4,584,107 | 4/1986 | Odaka et al. | 210/760 |
| 4,746,434 | 5/1988 | Grieves et al. | 210/610 |
| 4,793,931 | 12/1988 | Stevens et al. | 210/636 |
| 4,826,605 | 5/1989 | Doble et al. | 210/760 |
| 4,849,114 | 7/1989 | Zeff et al. | 210/747 |
| 4,948,511 | 8/1990 | Swanson et al. | 210/634 |

FOREIGN PATENT DOCUMENTS

| | | |
|---|---|---|
| 0313489 | 4/1989 | European Pat. Off. |
| 669091 | 3/1952 | United Kingdom |
| 812648 | 4/1959 | United Kingdom |

OTHER PUBLICATIONS

"Ridding Process Waters and Caustic Solutions of Sulfides" by A. G. Smith; Jul. 9, 1956 pp. 95-99.
"New Column Removes Sulfide With Air" by Janice D. Martin and L. D. Levanas; May 1962, vol. 41, No. 5 pp. 149-153.
"A Plant for the Oxidation of Sulphide-Containing Refinery Wastes by Air" by Otto Abeg; Oct. 18, 1960.
"Plant for the Oxidation of Sulphide-Containing Refinery Wastes by Air" by Otto Abegg and Johannes Elster; Petrochemie Sep. 1962.
Proceedings of the 42nd Industrial Waste Conference May 12, 13, 14, 1987 Purdue University, West Lafayette, Ind.; "Spent Caustic Treatment and Disposal" by Yi-Shan Chen pp. 429-436.
"Petroleum Refinery Industry" Energy Saving and Environmental Control by Sitting M. copyright 1978.
"Wet Air Oxidation of Hazardous Organics in Wastewater" by Dietrich et al. Aug., 1985; Environmental Process vol. 4, No. 3 pp. 171-177.
"Pulse Radiolysis of Aqueous Sulfite Solutions" by Zagorski et al., The Journal of Physical Chemistry vol. 75, No. 23, Nov. 23, 1971 pp. 3510-3517.
"Evolution of the Ozone/UV Process for Eastewater Treatment" by H. William Prengle, Jr.; Sep., 1977.

*Primary Examiner*—Neil M. McCarthy
*Attorney, Agent, or Firm*—Hedman, Gibson & Costigan

[57] ABSTRACT

The present invention relates to a process for treating and regenerating a spent caustic solution at ambient temperatures which includes oxidizing the spent caustic stream with an air/ozone gas mixture, followed by irradiating the oxidized spent caustic stream with a broad range of ultraviolet radiation and finally filtering the spent caustic solution.

7 Claims, 2 Drawing Sheets

PROCESS FOR TREATING AND REGENERATING SPENT CAUSTIC

FIELD OF THE INVENTION

This invention relates to an improved process for treating effluent containing organic and inorganic impurities. More particularly, the invention relates to a multi-stage process arranged to synergistically treat a caustic containing solution which provides an environmentally acceptable liquid for discharge into the environment and regeneration of the caustic solution.

BACKGROUND OF THE INVENTION

It has become essential to scrub gases produced in various hydrocarbon cracking processes to remove various contaminants. For example, flue gases generated in the production of ethylene are scrubbed with an aqueous sodium hydroxide solution to remove hydrogen sulfide, carbon monoxide and other impurities. As a result, the gaseous product stream is relatively clean, however, the treatment results in a liquid contaminated with the various impurities removed from the gaseous product stream.

A great deal of attention has been paid to treating the liquid effluent resulting from the caustic treatment of flue gases to provide an environmentally acceptable effluent for discharge into the environment.

One approach has been to oxidize sulfides and other inorganic sulfur acid salts in an alkaline solution to both thiosulfate ions and sulfate ions. The process typically used is referred to as a wet air oxidation (WAO) process in which gaseous oxygen in the form of fine bubbles is contacted with the spent caustic effluent in contacting columns for relatively long periods of time.

Chemical reagent oxidation (CRO) of sulfide-containing effluents has also been proposed as illustrated in U.S. Pat. No. 4,417,986 and U.S. Pat. No. 4,584,107 which teach the use of hydrogen peroxide and ozone in the treatment of spent caustic effluents.

Various other approaches to the treatment of water containing impurities have also been proposed. For example, the oxidizing of toxic compounds by using a combination of ozone, hydrogen peroxide and ultraviolet radiation has been proposed as illustrated in U.S. Pat. No. 4,849,114.

Similarly, mechanical separation methods employing ultrafiltration membranes have been used to separate solids and various high molecular weight compounds from effluents.

Combinations of the various processes have also been attempted with varying results.

However, a means to treat a spent caustic effluent to achieve an environmentally acceptable discharge product and regenerate the caustic solution has not yet been developed.

SUMMARY OF THE INVENTION

As a result, the present invention provides a process for synergistically treating a spent caustic effluent to provide an environmentally safe discharge and to effect regeneration of the caustic solution.

It is an object of the present invention to provide a process for treating spent caustic effluent at ambient temperatures.

It is a further object of this invention to provide a process for the regeneration of a spent caustic solution.

To this end, the subject invention proceeds by the treatment of contaminated caustic effluent in a multistage process after the removal of dispersed oil from the spent caustic effluent. Initially, the spent caustic effluent is subjected to air/ozonation oxidation in a batch type, or co-current or countercurrent column type reactor followed by ultraviolet radiation, and finally nanofiltration.

DETAILED DESCRIPTION OF THE INVENTION

The process of the subject invention has application in virtually any environment in which a fluid is to be treated for the removal of impurities. However, the process will be described in the environment of an ethylene plant.

Figure 1:
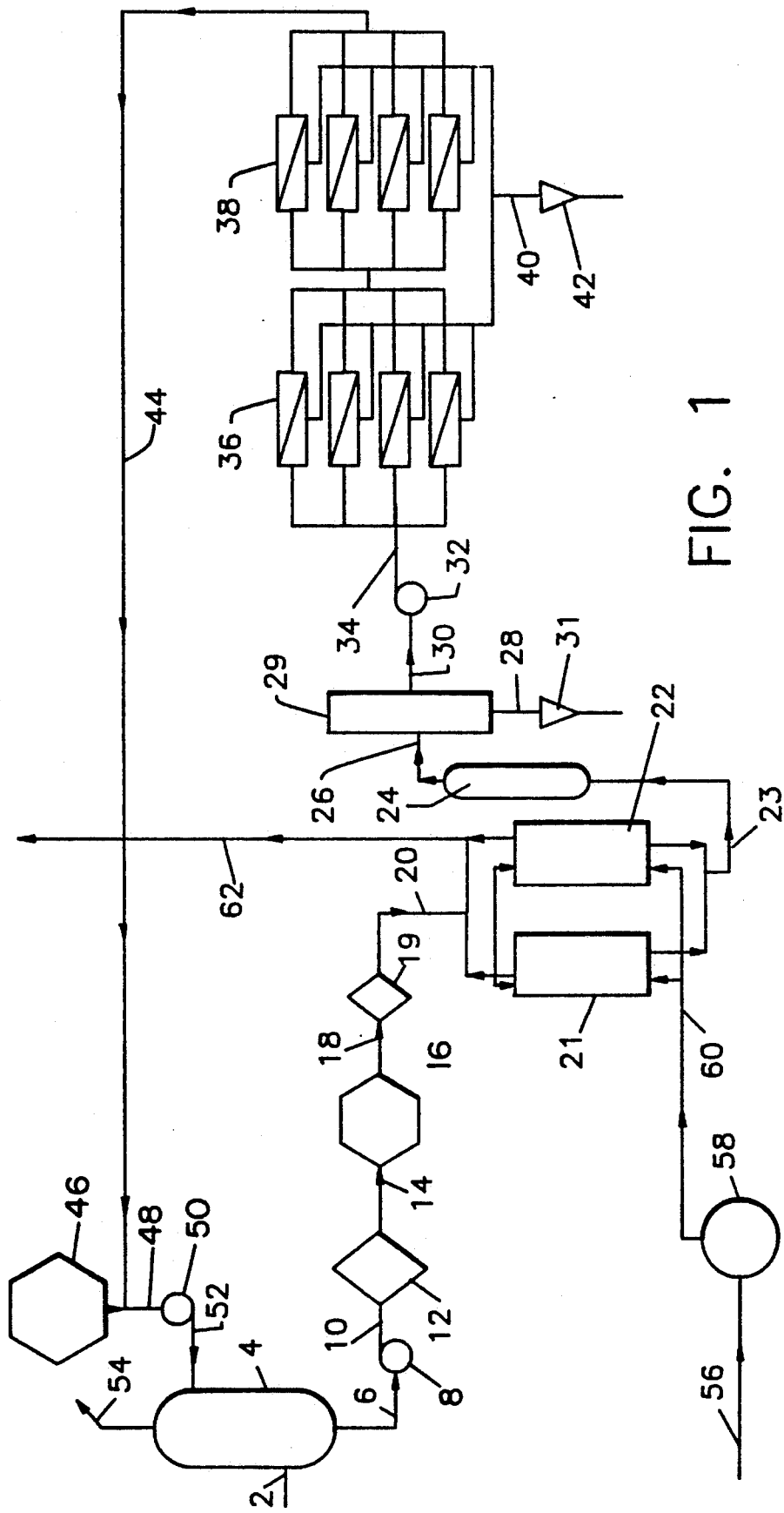
FIG. 1 is a schematic diagram of a preferred version of the invention.

As seen in FIG. 1, the process of the present invention is a multi-step process which, in its most basic format, treats at ambient temperatures an effluent containing both inorganic and organic contaminants by first subjecting the effluent to a dispersed oil removal step, followed by an air/ozone oxidation step, an ultraviolet radiation step and finally a filtration step. This arrangement produces a synergetic effect that results in a treated effluent that is environmentally safe.

Referring to FIG. 1, sour process gas from an ethylene plant flows into a caustic treatment tower 4 by line 2. The sour process gas is absorbed of harmful and environmentally unacceptable components in the caustic treatment tower 4. Clean or sweet process gas is discharged from the caustic treatment tower 4 by line 54.

The caustic solution containing the harmful components from the sour process gas is removed from the caustic treatment tower 4 by line 6. The composition of the spent caustic solution as it leaves the caustic treatment tower 4 through line 6 is water, sodium hydroxide, sodium carbonate, sodium sulfide, oil, benzene, substituted aromatics, dienes, and aliphatics.

From line 6 the spent caustic solution is pumped into a gasoline mixing drum 12 via line 10 by a caustic treatment pump 8. The spent caustic solution flows from the gasoline mixing drum 12 to a deoiling drum 16 by line 14. The spent caustic solution flows from the deoiling drum 16 through line 18 to a degassing drum 19. The gasoline mixing drum 12, deoiling drum 16 and degassing drum 19 remove 70–100% of dispersed oil that may have been transferred to the spent caustic solution by the sour process gas. The gasoline mixing drum 12, deoiling drum 16 and degassing drum 19 are standard type drums available from any local fabricator of such equipment.

The spent caustic solution flows from the degassing drum 19 through line 20 to a reactor vessel 21 or 22. The reactor vessels 21 and 22 may either be a continuous column type vessel or a batch type vessel. The preferred embodiment employs a batch type vessel which is obtainable from any vessel fabricator.

The spent caustic solution is treated in the reactor vessels 21 or 22 at the ambient temperature of approximately 80° F. to 120° F. with an air/ozone mixture. The preferred amount of ozone supplied to batch reactor vessel 21 or 22 is roughly 1 lb of ozone per 1 lb of TOC (total organic content) and 0.6 lb of ozone per 1 lb of sodium sulfide (the major contributor to the Chemical Oxygen Demand or COD) in the spent caustic solution.

The air/ozone mixture is supplied to the reactor vessels 21 and 22 by line 60. The air for the mixture is supplied by line 56 and the ozone is supplied by the ozone generator 58.

The gas from the reactor vessels 21 and 22 is vented by line 62 to either a stack discharge, or to VOC (volatile organic content) treatment and/or ozone destruction if required.

After the spent caustic is oxidized with the air/ozone mixture, it is subjected to ultraviolet radiation, further oxidizing the harmful components of the spent caustic solution. The spent caustic solution can be subjected to ultraviolet radiation while it is in the reactor vessels 21 or 22, either after the spent caustic solution is oxidized by the air/ozone mixture or concurrently with the application of the air/ozone oxidation. In the preferred embodiment, the spent caustic solution leaves the reactor vessels 21 and 22 by line 23 after being contacted with the air/ozone mixture and is subjected to ultraviolet radiation in a separate ultraviolet reactor 24. The preferred ultraviolet radiation source is comprised of a vessel having a centrally disposed hermetically sealed and grounded quartz sleeve surrounded in a spaced relationship by a non-grounded metal sleeve. An annulus is provided between the quartz sleeve and the metal sleeve for the passage of effluent issuing from the reactor vessels 21 and 22. Centrally disposed within the quartz sleeve is a conventional electrode immersed in a xenon gas mixture. This ultraviolet generating assembly produces a broad spectrum of emission, generally between 185 nm to 300 nm, instead of a point spectrum of 254 nm as with a conventional glass ultraviolet generating system. An illustrative ultraviolet radiation system is commercially available from EEG, Inc., Salem, Mass.

This ultraviolet radiation system serves to increase the conversion rate of the unwanted sulfite ion to the acceptable sulfate ion. Furthermore, it has the overall effect of rapidly polishing or driving the oxidation reactions toward completion in the spent caustic solution which were initiated by the air/ozone mixture.

After the spent caustic solution is subjected to the air/ozone oxidation step and the ultraviolet radiation step, all the inorganics in the spent caustic solution should be oxidized to their highest oxidation state. The composition of the spent caustic solution at this stage of the process is roughly sodium hydroxide, sodium carbonate, sodium sulfate and some carbonyls. All the dispersed oil, aromatics, sulfides and thiosulfates will have been substantially oxidized or removed and the COD (chemical oxygen demand) will have been reduced by about 85-90%.

After the harmful components of the spent caustic solution have been subjected to the air/ozone oxidation step and the ultraviolet radiation step, the spent caustic flows through line 26 to the beginning of the filtration step of the process. The first phase of the filtration step consists of a ten micron filter 29 which removes any suspended solids in the spent caustic solution. The suspended solids leave the filter 29 by line 28 to a collection area 31.

The spent caustic solution flows from the ten micron filter 29 through line 30 to a high pressure pump 32, then through line 34 to two separate nanofiltration banks 36 and 38, arranged in series. Each nanofiltration bank contains a plurality of membranes comprised of spirally wound or multi-stage nanofiltration membranes designed for the separation of ionic species. Ionic separation in the nanofiltration banks 36 and 38 is aided by the use of a polymer coating on the membranes that has an electric charge in its pore structure. The solvent water mixture used to spread the polymer coating on the membrane also has an electric charge. Therefore, it is believed the ionic separation occurs by size exclusion with the membrane, solubility with either the polymer or water, and/or electrical attractiveness with the membrane, polymer or water.

A particularly suitable nanofiltration assembly is manufactured by Desalination Systems, Inc., Escandido, Calif.

The first nanofiltration bank 36 removes less than 0.1% of the sodium hydroxide, 70-75% of the sodium carbonate, 95-100% of the dissolved solids with a molecular weight greater than 150 and 75-80% of the dissolved sulfur salts. The second nanofiltration bank 38 removes less than 0.1% of the sodium hydroxide, 95-100% of the sodium carbonate, 100% of the dissolved solids with a molecular weight greater than 150 and 75-80% of the dissolved sulfur salts.

The reject of the nanofiltration banks 36 and 38 flows through line 40 to collection area 42, where it is sent to a closed drain for transfer to the plant's wastewater treatment or is further concentrated by successive filtration for sale to the pulp and paper industries for use as a salt liquor or by evaporation for sale to the glass industry as salt cake. Alternatively the reject can be sent to a cooling tower basin as cooling water makeup provided the cooling tower chemical treatment is handled by slipstream ozonation.

The permeate of the nanofiltration banks 36 and 38 is the regenerated caustic solution and it flows through line 44 to line 48, which is downstream of the concentrated caustic tank 46. The regenerated caustic solution is mixed in line 48 with concentrated caustic from the concentrated caustic tank 46. The mixing in line 48 adjusts the concentration of the caustic in the regenerated caustic solution to approximately 8 percent by weight of NaOH before the regenerated caustic solution is returned to the caustic treatment tower 4. After the mixing, pump 50 pumps the regenerated caustic solution through line 52 to the caustic treatment tower 4 to begin the process again.

The following are the results obtained from a prophetic run of the above-described process.

The caustic treatment tower 4 has a volume of 37,000 gals. 355,000 lbs/hr of sour process gas enters the caustic treatment tower 4. Fresh caustic solution from line 52 enters the treatment tower 4 at a rate of 110,000 lbs./hr. in a counter current flow to the entering sour process gas. The concentration of the fresh caustic solution is approximately 8 weight percent NaOH in water.

18,000 lbs/hr of spent caustic solution is discharged from the caustic treatment tower 4 at a temperature between 80°-120° F. The spent caustic solution has the following composition:

| COMPONENT | LBS./HR. |
| --- | --- |
| OIL & GREASE | 3.6 |
| NaOH (sodium hydroxide) | 360.0 |
| Na$_2$CO$_3$ (sodium carbonate) | 306.0 |

-continued

| COMPONENT | LBS./HR. |
|---|---|
| Na₂S (sodium sulfide) | 3.6 |
| Na₂SO₃ (sodium sulfite) | 0.04 |
| Na₂SO₄ (sodium sulfate) | 0.004 |
| Na₂S₂O₃ (sodium thiosulfate) | 0.04 |
| BENZENE | 3.6 |
| TSS | 1.8 |

The spent caustic solution then enters the gasoline mixing drum 12, deoiling drum 16, and degassing drum 19 where 100% of the oil and grease is removed.

The spent caustic solution then proceeds to a batch reactor vessel 21 which has a volume of 9000 gallons. In the reactor 21, the spent caustic solution is treated with an air/ozone mixture having 99% air to 1% ozone. The mixture remains on the reactor vessel for 5 hours.

The composition of the spent caustic solution after being treated with the air/ozone mixture is:

| COMPONENT | LBS./HR. |
|---|---|
| OIL & GREASE | 0.036 |
| NaOH (sodium hydroxide) | 360.0 |
| Na₂CO₃ (sodium carbonate) | 306.0 |
| Na₂S (sodium sulfide) | 0.0 |
| Na₂SO₃ (sodium sulfite) | 0.59 |
| Na₂SO₄ (sodium sulfate) | 5.3 |
| Na₂S₂O₃ (sodium thiosulfate) | 0.37 |
| BENZENE | 0.0 |
| TSS | 1.8 |

The spent caustic solution is subsequently subjected to ultraviolet radiation in a range of between 185 nm and 300 nm. The resulting composition of the spent caustic solution is:

| COMPONENT | LBS./HR. |
|---|---|
| OIL & GREASE | 0.036 |
| NaOH (sodium hydroxide) | 360.0 |
| Na₂CO₃ (sodium carbonate) | 306.0 |
| Na₂S (sodium sulfide) | 0.0 |
| Na₂SO₃ (sodium sulfite) | 0.0 |
| Na₂SO₄ (sodium sulfate) | 6.67 |
| Na₂S₂O₃ (sodium thiosulfate) | 0.0 |
| BENZENE | 0.0 |
| TSS | 1.8 |

In the final phase of the process, the spent caustic stream passes through a ten micron filter 29 which removes 100% of the suspended solids and then into two nanofiltration banks 36 and 38 connected in series. The permeate from the first nanofiltration bank 36 has a composition of:

| COMPONENT | LBS./HR. |
|---|---|
| OIL & GREASE | 0.0 |
| NaOH (sodium hydroxide) | 359.0 |
| Na₂CO₃ (sodium carbonate) | 77.0 |
| Na₂S (sodium sulfide) | 0.0 |
| Na₂SO₃ (sodium sulfite) | 0.0 |
| Na₂SO₄ (sodium sulfate) | 2.0 |
| Na₂S₂O₃ (sodium thiosulfate) | 0.0 |
| BENZENE | 0.0 |
| TSS | 0.0 |

The permeate from the second nanofiltration bank 38 has the following composition of:

| COMPONENT | LBS./HR. |
|---|---|
| OIL & GREASE | 0.0 |
| NaOH (sodium hydroxide) | 358.0 |
| Na₂CO₃ (sodium carbonate) | 2.0 |
| Na₂S (sodium sulfide) | 0.0 |
| Na₂SO₃ (sodium sulfite) | 0.0 |
| Na₂SO₄ (sodium sulfate) | 0.5 |
| Na₂S₂O₃ (sodium thiosulfate) | 0.0 |
| BENZENE | 0.0 |
| TSS | 0.0 |

The permeate of the filtration step is the regenerated caustic solution and is sent by line 44 to line 48, where it is mixed with concentrated caustic from the concentrated caustic tank 46. The regenerated caustic solution is then pumped by pump 50 through line 52 to the caustic treatment tower 4 to begin the process again.

The reject from the nanofiltration banks 346 and 38 has the following composition:

| COMPONENT | LBS./HR. |
|---|---|
| OIL & GREASE | 0.0 |
| NaOH (sodium hydroxide) | 2.0 |
| Na₂CO₃ (sodium carbonate) | 304.0 |
| Na₂S (sodium sulfide) | 0.0 |
| Na₂SO₃ (sodium sulfite) | 0.0 |
| Na₂SO₄ (sodium sulfate) | 6.17 |
| Na₂S₂O₃ (sodium thiosulfate) | 0.0 |
| BENZENE | 0.0 |
| TSS | 0.0 |

In a separate experiment, the effect of the quartz enclosed ultraviolet radiation source 24 on the sulfite ion was determined. In the first run, a control solution containing sulfite ions was periodically checked to determine the effect of time on the sulfite concentration of the solution. The results showed that after approximately two hundred and fifty minutes, the concentration of the sulfite ion was negligibly reduced.

In a second run, an aqueous sulfite solution was subjected to ultraviolet radiation from the quartz enclosed ultraviolet radiation source 24. The capacitance of the ultraviolet radiation source was five kilovolts. The results showed that after about 75 minutes the concentration of the sulfite ion had been reduced by about 50%.

In a third run, an aqueous sulfite solution was subjected to ultraviolet radiation from the quartz-enclosed ultraviolet radiation source 24 where the radiation was produced with double the capacitance of the second run or ten kilovolts. The results show that after approximately 60 minutes the concentration of the sulfite ion had been reduced by about 50%.

Figure 2:
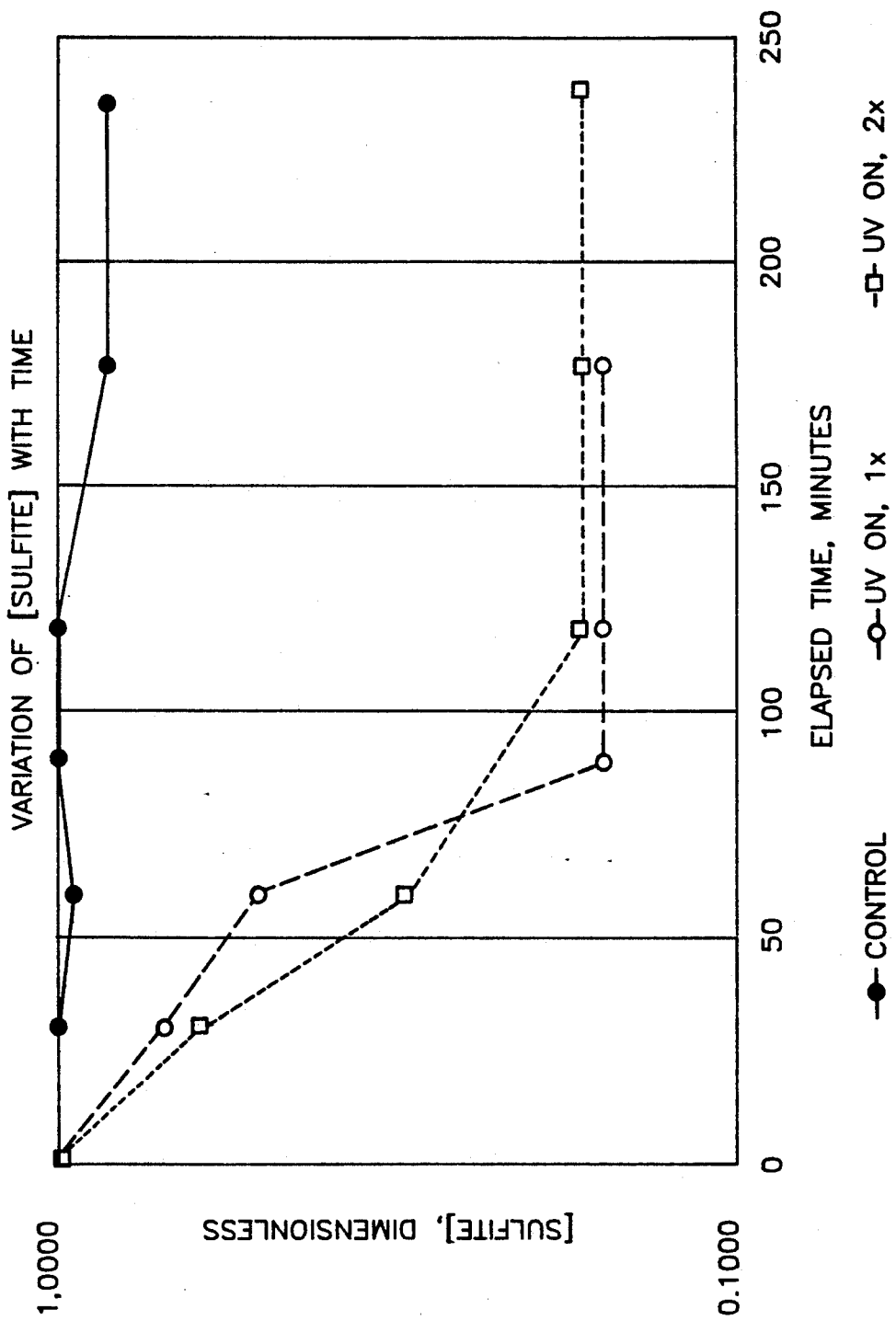
FIG. 2 is a graphical representation of the effect of ultraviolet radiation in the range of 185 nm to 300 nm on the sulfite ion in comparison to the effects on the sulfite ion in the absence of such ultraviolet radiation.

The results of these runs are shown in graphical form in FIG. 2.

Many variations of the present invention will suggest themselves to those skilled in this art in light of the above-detailed description. All such obvious variations are within the full intended scope of the appended claims.

I claim:

1. A process for treating a spent caustic solution derived from washing hydrocarbon process effluents comprising sulfides and other inorganic sulfur acid salts at ambient temperatures comprising;

(a) removing residual dispersed oil from the spent caustic solution before oxidizing the spent caustic solution;

(b) oxidizing the spent caustic solution in a reactor vessel with an air and ozone gas mixture;
(c) radiating the ozidized spent caustic solution with ultraviolet radiation;
(d) filtering the oxidized and radiated spent caustic solution; and
(e) discharging the treated spent caustic solution.

2. A process according to claim 1 wherein the treated spent caustic solution discharge is recycled for use in washing said hydrocarbon process effluents.

3. A process according to claim 1, wherein the ozone of the oxidizing step is supplied in an amount of 1 lb of ozone per pound of total organic content and 0.6 lb of ozone per 1 lb of sodium sulfide.

4. A process according to claim 1, wherein the ultraviolet radiation has a wavelength of from 185 to 300 nm.

5. A process according to claim 1, wherein the filtering step further comprises pumping the spent caustic solution through a ten micron filter to produce a permeate and pumping the ten micron filter permeate through a plurality of serially connected nanofiltration banks.

6. A process according to claim 5, wherein the nanofiltration banks remove ionic species.

7. A process for regenerating a spent caustic stream which consists essentially of:
(a) removing residual dispersed oil from the spent caustic stream;
(b) oxidizing the deoiled spent caustic stream at temperatures in the range of from 80° F.–120° F., with an air/ozone gas mixture in a reactor vessel;
(c) radiating the oxidized spent caustic stream with ultraviolet radiation having a wavelength in the range of from 185 nm to 300 nm by flowing the oxidized spent caustic through an annulus between an outer metal sleeve and a quartz sleeve enclosing an ultraviolet light source;
(d) filtering the radiated spent caustic stream through a ten micron filter to provide a permeate;
(e) filtering the permeate of the ten micron filter through a plurality of serially connected nanofiltration banks to remove ionic species and produce a nanofiltration permeate; and
(f) returning the nanofiltration permeate for recycling the caustic stream.

* * * * *

UNITED STATES PATENT AND TRADEMARK OFFICE
CERTIFICATE OF CORRECTION

PATENT NO. : 5,268,104
DATED : December 7, 1993
INVENTOR(S) : Massoomian

It is certified that error appears in the above-indentified patent and that said Letters Patent is hereby corrected as shown below:

On the Title page, item [75] inventor's name should be --Stephen Z. Massoomian--.

Column 6, line 19, delete "346" and insert --36--.

Signed and Sealed this

Seventeenth Day of May, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO : 5,268,104

DATED : December 7, 1993

INVENTOR(S) : Stephen Z. Masoomian

It is certified that error appears in the above-identified patent and that said Letters Patent is hereby corrected as shown below:

On the Title page, item [75], inventor should be -- Stephen Z. Masoomian--

This certificate supersedes Certificate of Correction issued May 17, 1994.

Signed and Sealed this

Twenty-second Day of November, 1994

Attest:

BRUCE LEHMAN

*Attesting Officer*  *Commissioner of Patents and Trademarks*